United States Patent [19]

Marschall

[11] Patent Number: 5,367,497
[45] Date of Patent: Nov. 22, 1994

[54] EXTENDED FREQUENCY RANGE HYDROPHONE

[76] Inventor: Richard A. Marschall, 5115 Echo Pines Cir. E., Ft. Pierce, Fla. 34951

[21] Appl. No.: 106,202

[22] Filed: Aug. 12, 1993

[51] Int. Cl.$^5$ .............................................. G01V 1/38
[52] U.S. Cl. ...................................... 367/20; 367/154; 367/155; 114/253; 310/337
[58] Field of Search ................. 367/20, 106, 130, 154, 367/155; 114/253; 310/337

[56]  References Cited

U.S. PATENT DOCUMENTS 4,241,427 12/1980 Swenson ................................ 367/20
4,901,287 2/1990 Hathaway et al. ..................... 367/20
4,955,012 9/1990 Bledsoe et al. ....................... 367/154
4,958,329 9/1990 Marschall .............................. 367/20

Primary Examiner—J. Woodrow Eldred
Attorney, Agent, or Firm—Alexander Norcross

[57]  ABSTRACT

The current invention discloses a construction of a hydrophone body and hydrophone sensors which provides a significantly enhanced wide band frequency sensor capability within the construction of a sensor array towed in a cable. This construction extends a tuned resonator or sensor along the hydrophone body and into an adjacent section of interconnecting cable. This elongated sensor, in the form of a tubular sensor, provides an enhanced, very low frequency sensing capability within the overall hydrophone array, supplementing the frequency range of the encased hydrophone sensor.

4 Claims, 2 Drawing Sheets

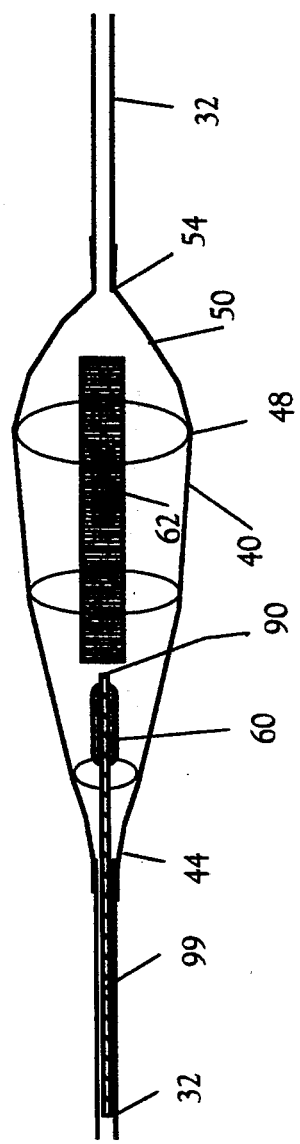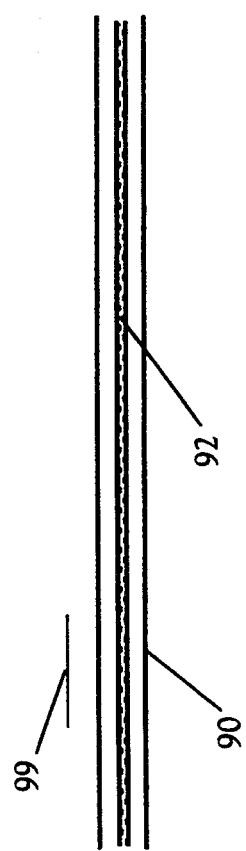

EXTENDED FREQUENCY RANGE HYDROPHONE

BACKGROUND OF THE INVENTION patent pertains to the field of hydrophones, and especially to arrays of hydrophones for use as towed active sensing devices. Such arrays are used to perform active sound imaging, and depend on a plurality of spaced, active sonic transducers at a controlled spacing for providing data which cannot be obtained readily from a single hydrophone.

U.S. Pat. No. 4,733,379 to Lapetina et al, discloses a form of towed hydrophone array of a type being a uniform diameter linear tube containing individual hydrophone transducers periodically spaced therein. This patent places great emphasis on acoustic cross coupling between each of the transducers. The transducers shown in the preferred drawing are orthogonal to each other, rotated at 90 degree angles.

Massa, U.S. Pat. No. 2,440,903 is an earlier towed array patent again showing a hose type streamer, and specifically claiming the interior, periodic structure of a transverse transducer and window, described internally as being flush with the hose for minimum turbulence. Despite this FIG. 1 discloses a structure No. 21 which is never used in the Art, primarily because any such protuberance would produce excessive noise.

In terms of towed, fish shaped or streamlined sensors, an early patent, U.S. Pat. No. 1,487,138 to Atwood, discloses a single towed elongate structure with tapered ends. At the time of this patent specifically the Art considered that the proper means of reducing the noise due to the rush of water past the towed article (the "fish") was by deployment at either a very low speed or zero forward speed with relative to the water. Despite the introduction of the uniform external cross-section tube, current towed arrays are still severely speed limited because of noise effects.

U.S. Pat. No. 3,842,398 to Massa shows, incident to an invention involving the interconnection of a hydrophone and a towed, expendable velocimeter, a construction for a towed hydrophone array showing a bulbous shaped hydrophone attached to a cable. The hydrophone is described as being embedded in a rigid potting compound, coated with a rubber or rubber-like coating and forming a blended streamline attachment to the outer jacket of the cable.

U.S. Pat. No. 3,990,035 to Byers discloses a hydrodynamically streamlined sonar apparatus. The housing shape is specifically described as being substantially oval in cross section through the length of the object and circular in cross section transverse to the direction of towing. The shape is further restricted to being a Joukowski streamlined shape and the housing is described as being principally rigid solid material. All the transducers of the array are enclosed in but a single housing.

U.S. Pat. No. 3,611,276 to Massa describes one of the velocimeters cited in Donald Massa's above cited U.S. Patent. Massa discloses a particular shape for free falling velocimeter having a predictable fixed rate of fall. Further the dropped device is a transmitter; therefore, there is no particular consideration for sensitivity or noise. Massa does describe the dimension of the streamlined probe with respect to the wave length of the sound waves concerned (note Column 4, line 65-75). Massa's shape is intended to achieve a stable free fall rate; turbulence effects are not addressed.

U.S. Pat. No. 4,031,502 to Lefaudeux, et al and U.S. Pat. No. 4,709,361 to Dahlstrom, et al are also of interest for the design of sensor shapes.

My prior U.S.Pat. No. 4,958,329, incorporated herein by reference, teaches and discloses a construction and hydrodynamic shape for a hydrophone body which has significantly reduced turbulence noise at the location of the hydrophone sensor. This body permits the construction of hydrophone arrays interconnected by thinner, more flexible cables than the prior art.

SUMMARY OF THE INVENTION

It is known from my prior patent that, in the field of hydrophones, forming a hydrophone containing body in a specified teardrop shape reduces turbulence noise around the hydrophone sensor and increases its effectiveness. An array of such shapes, towed in series along a cable, has significantly lowered levels of turbulence induced noise. However, fluid flow along the interconnecting cable still generates turbulent boundary layer and vibrational noise which propagates into adjacent hydrophones.

The current invention discloses a construction of hydrophone body and hydrophone sensors which provides a significantly enhanced wide band frequency sensor capability within the construction of the array of my prior patented invention. This construction extends a tuned resonator or sensor along the hydrophone body and into an adjacent section of interconnecting cable. This elongated sensor, in the form of a tubular sensor, provides an enhanced, very low frequency sensing capability within the overall hydrophone array, supplementing the frequency range of the encased hydrophone sensor.

This construction makes feasible a sequential array of hydrophones strung along the cable which is towed behind a ship in water.

It is thus an object of this invention to show a construction of a hydrophone which makes feasible a low noise, wide frequency range towed hydrophone array.

It is a further object of this invention to disclose a construction for an array of hydrophones which overcomes the effect of high frequency distortion in extended tubular hydrophone sensors.

It is a further object of this invention to disclose a construction of a hydrophone array which has an enhanced low frequency capability without reducing its high frequency capabilities.

BRIEF DESCRIPTION OF THE DRAWINGS

FIG. 2 is a section view of an improved hydrophone of the invention.

FIG. 3 us a section detail of an embodiment of the extended sensor element of the improved hydrophone.

DETAILED DESCRIPTION OF THE PREFERRED EMBODIMENT

Figure 1:
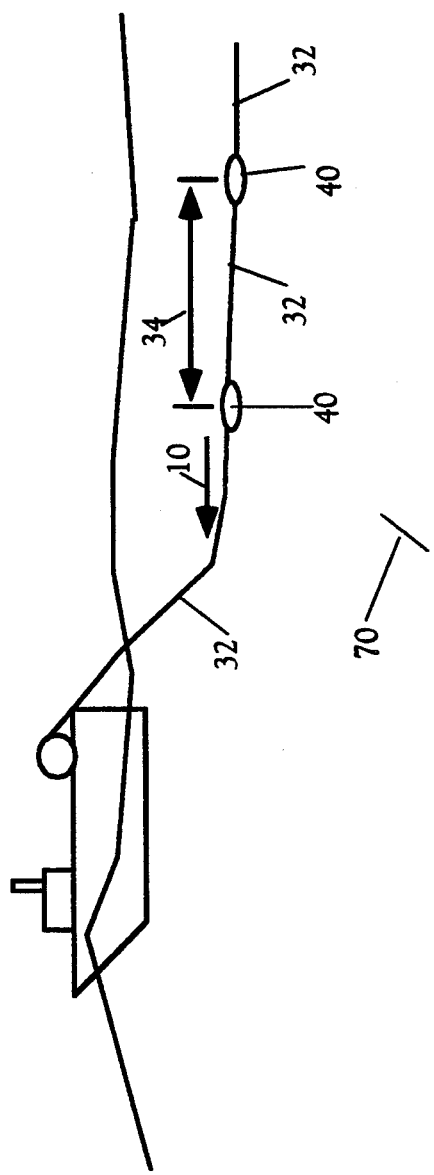
FIG. 1 is an illustrative depiction of a towed array of the invention, not to scale.

Applicant here shows as an exemplary form of applicant's invention a particular hydrophone body designed for a particular towed hydrophone array.

This example is described in some detail as to its shape and its external configuration for the purposes of conveniently providing a describable example and illustrating the best mode known to the applicant of carrying out his invention. However, as the invention is of a hydrophone shape for containing an acoustic sensor, the form of the primary acoustic sensor 60, the supporting electronics, and the electric circuit and cabling are not described, being well understood in the art. It is sufficient, for the purposes of describing this invention, that the towing cable described below provides a towing force for the hydrophone, spaces the hydrophones into an array, and maintains an electrical and signal connection between individual hydrophones within each hydrophone body and data analysis equipment on board a towing vessel.

Throughout this discussion, it should be understood that the specific shapes and spaces given are not restrictive but rather are examples.

Parsons, et al "The Optimum Shaping of Axisymmetric Bodies for Minimum Drag in Incompressible Flow", J. Hydronautics, Vol. 8 No. 3, July 1974, pp. 100–107 discusses a known series of body shapes generally known as "hydrodynamically smooth"; this is defined as bodies which have a cross sectional geometric section, following a described procedure attributed to Granville, in which the body outline is continuous through the second derivative, without unwanted inflection.

Considerable research exists in regards to the forming of shapes for the reduction of drag in towed vehicles in an incompressible media such as water, in each case seeking to reduce the total force required to tow vehicles either at low or at relatively high speeds, low speeds being in the vicinity of 0–3 or 5 knots, high speeds being at 20 knots or above. Some such research indicates drag may be reduced by reducing boundary layer separation from the shape. Equally, it is recognized that controlled turbulent flow may reduce drag, especially at high Reynolds numbers.

Separately, research has indicated that boundary layer separation may be minimized by providing a coating on the body which provides a distributed damping effect, especially at higher Reynolds Numbers. See for instance, Kramer "Boundary-Layer Stabilization by Distributed Damping", ASME Journal, February 1960, p. 245–233, describing the use of a heavy diaphragm outer coating, damped by an internal liquid dampening for reducing boundary layer separation and turbulent generation in a towed hydrodynamic body.

Separately it has been discovered in incompressible fluid flow (at high Reynolds) Numbers that controlled turbulence onset may be utilized to reduce drag. The common golf ball is a prevalent exemplar of this.

In a towed hydrophone array, of the class of the instant invention, the total drag on the array is a very minor consideration. The invention of my prior patent provides a hydrophone of increased sensitivity by eliminating or reducing the turbulence noise through the shaping and construction of the hydrophone body. As a consequence, other, formerly ignored, sources of noise now become the limiting criteria on the operating capability of a hydrophone array. The principal consideration remains the problem of acoustical noise, especially within the frequency range of primary interest to the hydrophones; in seismic hydrophones this is predominantly low acoustical frequencies ranging from 500 down to 17 hertz or lower. Flow separation or turbulence within an otherwise laminar boundary flow along the interconnecting cables between hydrophones in an array cannot be avoided. The noise generated by this partly turbulent fluid flow is now a limiting factor on sensitivity of the array.

One method of reducing self noise, particularly turbulent boundary layer (TBL) noise, on traditional constant diameter seismic streamers, is to make the sensors physically long. While effective against certain noises, extended sensors often suffer from a number of signal distortions, particularly at relatively high frequencies.

My prior patent discloses an array, towed by a towing cable, having a defined smoothness and varying thickness, but of a size minimally established by connecting cables and the need for a towing strength. Spaced along the cable are individual hydrophone bodies of the inventive type.

The inventive hydrophone bodies 40 are more particularly shown by the exemplar model shown in FIG. 2. The body 40 is externally hydrodynamically smooth. Ignoring the towing cable 32 which is connected to both the nose 44 and the tail 50 of the body 40, a cross section through the body 40 along a plane parallel to the direction of tow 10 would show a smooth curve rising to a point of maximal cross-sectional diameter 48 from nose 44 to mid-body 48 and then decreasing to the tail 50; the curve preferably would have no points of inflection. At a minimum, mathematically the curve would have continuous second order derivatives.

It should be noted that no points of inflection is an impossible condition to meet at the point 54 at which the body 40 adjoins the tail towing cable (also called a bridle) 32 where a point of a inflection of necessity must occur.

The hydrodynamically smooth hydrophone bodies of my prior U.S. Pat. No. 4,958,329 are also effective in making up arrays having significantly reduced streamer self noise. My hydrophone bodies, while effective against a broad band of noise, particularly at high frequencies, are less effective at very low frequencies, which, for a typical geophysical survey speed would be less than a few Hertz.

In the preferred embodiment here disclosed, the specific sizes and dimensions of both the hydrophone body and the hydrophone body spacing distance 34 are determined by the acoustics of the desired frequency sensitivity of the hydrophone array. Given an assumed constant speed of sound within a fluid media, (for the purposes of this example the speed of sound in saltwater is 1500 meters per second), the array is designed to be spaced so that the spacing 34 between successive hydrophone bodies 40a, 40b is one-half wave length at the highest frequency of interest.

For example, with a frequency sensitivity having a highest interest frequency of 500 hertz, the array would be spaced with hydrophones at 1.5 meter intervals; a 250 hertz array would have a three meter spacing between hydrophone bodies. A full seismic array would then be built of sections having periodically spaced hydrophone bodies of the described type; a typical array would have as many as 960 such bodies and could extend over two kilometers long.

My invention combines extended sensors with the hydrodynamically smooth bodies of my prior patent to achieve wide range array self noise reduction while preserving signal fidelity. An array of smooth hydrophone bodies are made with a separate enclosed array of extended sensors which pass through the hydrophone bodies or extend between the bodies; in either case the extended sensors extend into the cable between the hydrophone bodies. The signals from both arrays of sensors are then combined to achieve an optimal signal to noise ration over the frequencies of interest.

Also, Ceramic Cylindrical shell hydrophones, while robust, are heavy making balancing a thin array difficult. Lightweight ceramic bender hydrophones are somewhat fragile and not suitable for certain applications likely to be subject to shocks. Piezoelectrically active plastic hydrophones, such as those of polyvinylidene fluoride (PVDF), are both robust and lightweight. Using cylindrical hydrophones that permit the electromechanical cable to pass through them allows for an axially symmetric construction providing high levels of acceleration canceling and immunity to extensional vibration induced noises.

This improvement in the hydrophone increases significantly the sensitivity of the hydrophone array to extremely low frequency sound. The construction of the hydrophone bodies as disclosed in my prior patent places a primary hydrophone sensor 60 in the front third of the hydrophone body, forward of the electronics package. I have discovered that a separate very low frequency sensor 99 may be provided within the array, which sensor 99 comprises an elongate tubular sensor having an enhanced low frequency response. One form of this extended sensor is a strip of piezo-electric active plastic sensitive film 92 such as PVDS (Polyvinylidene Fluoride) plastic films. A elongated thin strip of such film 92, in a thin tube 90, is acoustically sensitive to very low frequencies.

Alternatively, such sensors may be a tube 90 with a number of internal sensors. In any case the overall extended sensor 99 is in the form of an elongated thin object.

I therefore mount such an elongated sensor 99 extending from the location of the primary hydrophone sensor 60 in the nose of the hydrophone body, extending axially through the hydrophone body 40 into an adjacent section of towing cable 32. The illustration shows the sensor extending forward into the forward section of cable, but it can also extend back through the tail 50 into the following cable, with suitable adaption of the electronics package 62 to permit such passage.

The inventive hydrophone therefore comprises two sensors; the nose mounted sensor 60, protected from noise by the shape and composition of the hydrophone body 40, and the elongated tubular sensor 99 which responds to sounds (or vibrations) of a frequency lower than the low frequency cutoff of the nose mounted sensor. The signal from the extended sensor 99 is filtered to eliminate the higher frequencies which in such a sensor are distorted; these higher frequencies are sensed by the primary sensor 60, giving continuous coverage for the inventive hydrophone throughout the extended frequency range which is the sum of the ranges of all sensors. For a typical marine seismic array, the extended sensor 99 array would be used for signals below about 10 to 20 hertz, with the hydrophone body enclosed sensor 60 used for frequencies above 10 to 20 hertz.

The resulting hydrophone array has a high sensitivity and responsiveness to a significantly wider range of sound frequencies than is possible in the prior art.

While a preferred configuration has been herein disclosed, it should be apparent that a wider variation of particular shapes is achievable within the general structure herein shown by the inventor. The invention is not therefore restricted to the particular variation shown here for illustrative purposes but rather to that wider range of variations as are inherent in the art.

I claim:

1. A hydrophone having an extended frequency range comprising:
   a hydrodynamically smooth shape hydrophone body, adapted for interconnection between sections of a towing cable;
   a primary hydrophone sensor within said body having a acoustic sensitivity having a low frequency cutoff;
   a hydrophone sensor comprising an elongated acoustically sensitive sensor within a tube extending from said hydrophone body into said towing cable section.

2. The apparatus of claim 1 further comprising:
   said elongated sensor having a very low frequency response and a distorted response at higher frequencies;
   said distorted higher frequencies being filtered out;
   said primary sensor providing a response at said higher frequencies.

3. The apparatus of claim 1, said sensor further comprising:
   an elongated strip of piezoelectric film within said tube.

4. The apparatus of claim 1, said sensor comprising:
   an elongated strip of PVDS film.

* * * * *